Oct. 3, 1933.                  L. W. WEBB                  1,929,297
                           REMOTE CONTROL SYSTEM
                             Filed May 4, 1932
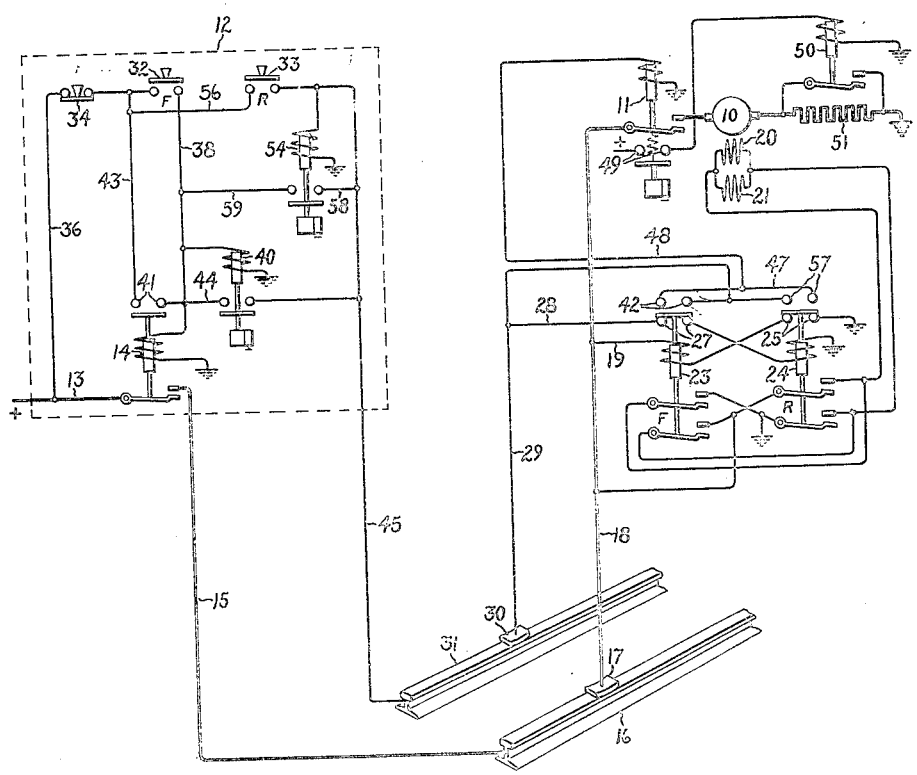
Inventor:
Lewis W. Webb,
by Charles V. Tullar
His Attorney.

Patented Oct. 3, 1933

1,929,297

UNITED STATES PATENT OFFICE 1,929,297

REMOTE CONTROL SYSTEM

Lewis W. Webb, Erie, Pa., assignor to General Electric Company, a corporation of New York Application May 4, 1932. Serial No. 609,295

6 Claims. (Cl. 104—151)

My invention relates to control systems for determining the direction of rotation of a driving motor and more particularly to carrier systems wherein the movement of a material carrying car or traction locomotive is to be controlled from a remotely located station, and has for an object the provision of a simple and reliable system of this character.

In accordance with my invention in one form thereof, I provide a single power rail by means of which the required amounts of power may be supplied to operate the driving motor of a material carrying car or locomotive, and a single control rail with the connections so arranged that the direction of rotation of the motor may be controlled by the order in which the power and control rails are energized. More particularly I provide forward and reverse push buttons by means of which one or the other of the rails is immediately energized, the energization of the other rail being effected a predetermined time thereafter.

For a more complete understanding of my invention reference should now be had to the accompanying drawing, the single figure of which diagrammatically illustrates my invention as applied to a remotely controlled locomotive.

Referring now to the drawing I have shown my invention in one form as applied to the control of a driving motor 10 arranged to be controlled from a remotely located tower 12. A supply conductor 13 connected by means of a contactor 14 and a conductor 15 to a power rail 16 is arranged to supply power to the motor 10 by means of a conducting shoe 17 and the conductor 18. The return connection to the power supply is by way of a ground connection indicated by the well understood symbol for that connection and in the case of a car or locomotive by means of the running rails. The energization of the armature of the motor 10 is controlled by means of a contactor 11 while the field winding 20 and a solenoid brake winding 21 are arranged to be energized by the closure of one or the other of the direction switches 23 and 24. It will be observed that the direction switch 23 has its operating coil connected to the power conductor 18 and through the interlock contacts 25 on the direction switch 24 to ground. The operating coil of the direction switch 24 is connected through the interlock contacts 27 of the direction switch 23 by means of conductors 28 and 29 to a conducting shoe 30 which is arranged to engage a control rail 31. The direction of rotation of the motor 10 is determined by the selection of a forward push-button switch 32 or a reverse push-button switch 33 provided in the tower 12. In series with these push-button stations there is provided a normally closed stop push-button 34 which is arranged to stop the travel of the locomotive driving motor 10 whenever desired.

In describing the operation of my invention, it will be assumed that the power lines are energized as indicated by the well understood symbols and that the forward push-button 32 has been depressed to select forward rotation of the motor 10. It will be observed that the operating coil of the contactor 14 is immediately energized by reason of the completion of its energizing circuit which may be traced from the supply line 13 by conductor 36, stop push-button 34, forward push-button 32, conductor 38, operating coil of contactor 14 and to ground. At the same time, a time closing relay 40 is energized and is connected to energize the control rail 31 after a predetermined length of time. The contactor 14 is immediately closed and connects the supply conductor 13 to the power rail 16. At the same time the push-button 32 is by-passed by the closing of the contacts 41 operated with the contactor 14.

The direction switch 23 is operated to its closed position, to establish connections for the field windings 20 for rotation of the motor 10 in a forward direction, by reason of the completion of its energizing circuit which may be traced from the supply conductor 13, contactor 14, conductor 15, power rail 16, conducting shoe 17, conductors 18 and 19, operating coil of the direction switch 23, interlock contacts 25 of the direction switch 24 and to ground. The closing of the contacts 42 operated with this switch partially completes an energizing circuit for the contactor 11.

After the expiration of a predetermined time interval the time relay 40 closes its contacts to energize the control rail 31 and the contactor 11 through a circuit which may be traced from the supply conductor 13, by conductor 36, stop push-button 34, conductor 43, contacts 41 of the contactor 14, conductor 44, contacts of the time delay relay 40, conductor 45, control rail 31, conducting shoe 30, conductor 29, contacts 42 of the direction switch 23 and by conductors 47 and 48 to the operating coil of the contactor 11. The contactor 11 is immediately closed to complete the energizing circuit for the armature of the motor 10. After a predetermined length of time the contacts 49 operated with the contactor 11 are closed to complete an energizing circuit for an accelerating contactor 50 connected in shunt with an accelerating resistor 51.

Though I have illustrated but a single accelerating contactor in order to simplify the drawing, it will be understood that a plurality of contactors may be used of any of the several well known types of automatic rheostatic control employed in preference to the one shown.

Continuing with the operation, if it is desired to stop the movement of the locomotive at any time it is only necessary to depress the stop button 34, which it will be observed interrupts the energizing circuits previously established for the contactor 14, the relay 40, the contactor 11 and the direction switch 23. These devices are all immediately operated to their open positions. It will be seen that the opening of the direction switch 23, deenergizes the field winding 20 as well as the solenoid brake winding 21, which brake (not shown) is operated to apply a braking effort to bring the motor 10 to a standstill.

For reverse operation of the motor 10 the control rail 31 is first energized and by means of a second time delay relay 54 the power rail 16 is energized after the connection for the field winding 20 has been completed for reverse rotation of the motor 10.

Assuming now that the reverse push-button 33 has been depressed, it will be seen that the control rail 31 is immediately energized through a circuit which may be traced from the supply conductor 13 by conductor 36, stop push-button 34, conductors 43 and 56, reverse push-button 33 and by conductor 45 to the control rail 31. The reverse direction switch 24 is immediately closed by reason of the completion of its energizing circuit which has just been traced as far as the control rail 31. From the control rail 31 this circuit may be traced by the conducting shoe 30, conductors 29 and 28, interlock contacts 27, operating coil of the direction switch 24, and to ground. The closing of the contacts 57 operated with this switch completes an energizing circuit from the control rail 31 for the operating coil of the contactor 11, which contactor immediately closes.

The operation of the push-button 33 also completes an energizing circuit for the time relay 54. After a predetermined time interval this relay closes to complete an energizing circuit for the contactor 14, which circuit may be traced from the supply conductor 13 by conductor 36, stop push-button 34, conductors 43 and 56, reverse push-button 33, conductors 45 and 58, contacts of the time relay 54, conductors 59 and 38, operating coil of the switch 14 and to ground. The contactor 14 is thereupon closed to energize motor 10 for rotation in a reverse direction. A holding circuit for the contactor 14 is again established, as has already been described, by means of the contacts 41. These contacts also serve to maintain the time delay relay 54 closed, thereby maintaining the circuit to the control rail 31. As before, the accelerating contactor 50 closes after a predetermined interval of time, thereby accelerating the motor to its full speed. To stop the motor 10 it is only necessary to depress the stop button 34 which interrupts the control circuit, and as before, the solenoid brake brings the locomotive to a standstill.

While I have shown a particular embodiment of my invention, it will be understood of course that I do not wish to be limited thereto, since many modifications may be made, and I therefore contemplate by the appended claims to cover any such modifications as fall within the true spirit and scope of my invention.

What I claim as new and desire to secure by Letters Patent of the United States, is:

1. In a system of control, the combination with a driving motor, of a control conductor and a power supply conductor, means for selectively controlling the energization of said conductors, and means responsive to the order in which said conductors are energized for energizing said motor for forward or reverse operation.

2. In a system of control, the combination with a driving motor, of direction switches therefor for energizing the motor for forward or reverse operation, each of said switches having an operating coil, a power conductor for supplying power to said motor, a control conductor, connections for respectively connecting the operating coils of said switches to said power and control conductors, and means for energizing first one and then the other of said conductors so as to control the direction of rotation of said motor.

3. The combination with a driving motor, a remote control system therefor including a power supply rail and a control rail, direction switches for energizing said motor for forward or reverse operation, means responsive to the energization of said power rail for energizing one of said direction switches, and means responsive to the energization of said control rail for energizing the other of said direction switches, interlocking means for each of said direction switches whereby said motor may be operated in one direction by first energizing the power rail, and may be operated in the other direction by first energizing the control rail.

4. In a system of control, the combination with an electric vehicle of a driving motor therefor, control circuits for selectively controlling the energization of said motor for forward or reverse operation, a control conductor for supplying power to said circuit for one direction of rotation, a power conductor for supplying power to said motor, and means responsive to the energization of said control conductor with said power conductor deenergized for completing a control circuit for one direction of rotation, and means responsive to the energization of said power conductor with said control conductor deenergized for completing a control circuit for reverse operation of said motor, whereby the direction of rotation of the motor is selected by first energizing one of said conductors and then energizing the other of said conductors.

5. In combination with an electric vehicle provided with a driving motor of means for controlling from a distance the operation of said motor comprising a forward and reverse push-button, a power rail and a control rail, time responsive means for each of said switches arranged to control the sequence of energization of the respective rails, means responsive to the initial energization of one of said rails for establishing connections for the rotation of the motor in one direction, and means responsive to the initial energization of the other of said rails for completing motor connections for the reverse direction of rotation.

6. In a system of control, the combination with a vehicle provided with a driving motor, of means for controlling from a distance the direction of rotation of said motor comprising, two rails for said car, forward and reverse control switches, means responsive to the operation of said forward control switch for energizing one of said rails with the second of said rails deenergized, a forward direction switch for said motor, an energizing circuit for said forward direction switch arranged to be completed by the energization of said first rail, timing means arranged to be operated by the operation of said forward control switch for energizing said second rail a predetermined time after said first rail is energized, and motor control means responsive to the energization of said second rail and to said forward direction switch for energizing said motor for said forward rotation, means responsive to the operation of said reverse control switch for energizing said second rail with said first rail deenergized, a reverse direction switch for said motor, an energizing circuit for said reverse direction switch arranged to be completed by the energization of said second rail, timing means arranged to be operated by the operation of said reverse control switch for energizing said first rail a predetermined time after said second rail is energized, said reverse direction switch operating said motor control means to energize said motor for reverse operation.

LEWIS W. WEBB.